US010730200B2

(12) United States Patent
Wheeler (10) Patent No.: US 10,730,200 B2
(45) Date of Patent: Aug. 4, 2020

(54) MULTI-LENGTH BUCKING ATTACHMENT

(71) Applicant: Jeremy Wheeler, Perry, GA (US)

(72) Inventor: Jeremy Wheeler, Perry, GA (US)

( * ) Notice: Subject to any disclaimer, the term of this patent is extended or adjusted under 35 U.S.C. 154(b) by 0 days.

(21) Appl. No.: 16/188,801

(22) Filed: Nov. 13, 2018

(65) Prior Publication Data

US 2020/0147826 A1 May 14, 2020

(51) Int. Cl.
*B27B 27/02* (2006.01)
*B27B 1/00* (2006.01)
*B27B 29/08* (2006.01)

(52) U.S. Cl.
CPC .............. *B27B 27/02* (2013.01); *B27B 1/002* (2013.01); *B27B 29/08* (2013.01)

(58) Field of Classification Search
CPC ......... B27B 27/02; B27B 1/002; B27B 29/08; B27B 17/0058; B27B 17/0091; A01G 23/00; Y10T 83/7108; Y10T 83/712; Y10T 83/7264; Y10T 83/7114; Y10T 83/7126; Y10T 83/8749; Y10T 83/8763
See application file for complete search history.

(56) References Cited

U.S. PATENT DOCUMENTS

| | | | | |
|---|---|---|---|---|
| 3,124,176 A * | 3/1964 | Vogini | .................... | B23Q 9/005 33/500 |
| 3,236,274 A * | 2/1966 | Eynon | ..................... | B27B 31/00 144/379 |
| 3,254,686 A * | 6/1966 | Boyd | ................... | B27B 17/0058 144/379 |
| 3,590,760 A * | 7/1971 | Boyd | .................... | A01G 23/085 144/4.1 |
| 3,623,519 A * | 11/1971 | Radle | .................... | A01G 23/006 83/471.2 |
| 3,677,312 A * | 7/1972 | Tanguay | ............... | B23Q 16/001 83/149 |
| 3,682,211 A * | 8/1972 | Kantola | .................. | A01G 23/00 144/4.1 |
| 3,688,818 A * | 9/1972 | Domres | ..................... | B27B 5/10 83/90 |
| 3,720,248 A * | 3/1973 | Mellgren | .............. | A01G 23/089 144/34.1 |
| 3,771,395 A * | 11/1973 | Heimerl | .................. | A01G 23/00 83/795 |
| 3,832,928 A * | 9/1974 | Copeland | ................ | A01G 23/00 83/468.2 |
| 4,123,957 A * | 11/1978 | Niemela | ............. | B27B 17/0058 83/564 |
| 4,210,049 A * | 7/1980 | Gauthier | ............. | B27B 17/0058 83/574 |

(Continued)

*Primary Examiner* — Jonathan G Riley
(74) *Attorney, Agent, or Firm* — Smith Tempel Blaha LLC; Gregory Scott Smith (57) ABSTRACT

A bucking apparatus to be used in conjunction with a loader and topping saw that are mounted to a logging platform or trailer. The bucking apparatus is attached to the loader and includes a plurality of hatches. The hatches can be adjusted for different lengths so that different length logs can be cut when eliminating faults from the trees. The hatches of the bucking apparatus are measured to be particular distances from the topping saw and so, when a tree is pulled through the topping saw with the loader, the end being held can be aligned with one of the hatches, and then the saw can be engaged thus creating a log of the particular length.

9 Claims, 7 Drawing Sheets

(56) References Cited

U.S. PATENT DOCUMENTS

| | | | | |
|---|---|---|---|---|
| 4,235,140 A * | 11/1980 | Reece | B27B 17/005 | 83/574 |
| 4,275,632 A * | 6/1981 | Ross | B27B 15/02 | 83/574 |
| 4,307,640 A * | 12/1981 | Michael | B27B 17/0058 | 83/574 |
| 4,325,543 A * | 4/1982 | York | B27B 17/0041 | 269/295 |
| 4,331,052 A * | 5/1982 | Neff | B27B 5/18 | 414/754 |
| 4,377,910 A * | 3/1983 | Landry, Jr. | B27B 17/0025 | 30/383 |
| 4,382,457 A * | 5/1983 | Hahn | B27B 31/08 | 144/24.13 |
| 4,437,368 A * | 3/1984 | Bennett | B27B 17/0041 | 105/160 |
| 4,483,379 A * | 11/1984 | Aikins | B27B 31/00 | 144/195.1 |
| 4,545,122 A * | 10/1985 | Durfee, Jr. | B27B 17/0025 | 30/383 |
| 4,609,070 A * | 9/1986 | Porps | B25H 1/06 | 182/129 |
| 4,625,407 A * | 12/1986 | Wallis | B27B 17/0025 | 30/383 |
| 4,653,556 A * | 3/1987 | Provolt | B23D 57/026 | 144/195.1 |
| 4,907,294 A * | 3/1990 | Bolton | B27B 31/06 | 144/357 |
| 5,035,166 A * | 7/1991 | Carlson | B23D 53/04 | 144/378 |
| 5,533,555 A * | 7/1996 | Hudson | B27L 1/00 | 144/24.13 |
| 5,539,991 A * | 7/1996 | Harrison | B25H 7/02 | 33/42 |
| 5,692,426 A * | 12/1997 | Alexander | B23D 53/12 | 269/295 |
| 5,884,545 A * | 3/1999 | Hamby, Jr. | B27B 1/002 | 144/245.2 |
| 5,887,635 A * | 3/1999 | Hamby, Jr. | A01G 23/097 | 144/24.13 |
| 6,167,926 B1 * | 1/2001 | Hudson | A01G 23/097 | 144/24.13 |
| 7,228,881 B1 * | 6/2007 | Smith | B27B 17/0091 | 144/193.1 |
| 7,861,416 B1 * | 1/2011 | Clark | B27B 17/0025 | 30/371 |
| 9,808,953 B1 * | 11/2017 | Sagorski | B25H 1/06 | |
| 2002/0162441 A1 * | 11/2002 | Dumas | B27B 17/0058 | 83/796 |
| 2006/0179982 A1 * | 8/2006 | Fenton | B27B 5/10 | 83/13 |
| 2009/0000698 A1 * | 1/2009 | Beresford | A01G 23/08 | 144/336 |
| 2011/0180505 A1 * | 7/2011 | Noniewicz | B27B 21/00 | 211/195 |
| 2012/0298260 A1 * | 11/2012 | Kamps | B27B 5/10 | 144/4.6 |
| 2014/0250707 A1 * | 9/2014 | Erickson | B27B 17/0025 | 33/630 |
| 2020/0070380 A1 * | 3/2020 | Olsen | B27B 31/00 | |

* cited by examiner

Prior Art

MULTI-LENGTH BUCKING ATTACHMENT

BACKGROUND

As the Monty Python song goes "I'm a lumberjack and I'm OK, I sleep all night and I work all day". Lumberjacks are North American workers in the logging industry who perform the initial harvesting and transport of trees for ultimate processing into forest products. The term usually refers to a bygone era (before 1945 in the United States) when hand tools were used in harvesting trees.[1]

[1] https://en.wikipedia.org/wiki/Lumberjack

The term lumberjack is of Canadian derivation. The first attested use of the word comes from an 1831 letter to the Cobourg Star and General Advertiser in the following passage: "my misfortunes have been brought upon me chiefly by an incorrigible, though perhaps useful, race of mortals called LUMBERJACKS, whom, however, I would name the Cossack's of Upper Canada, who, having been reared among the oaks and pines of the wild forest, have never been subjected to the salutary restraint of laws."[2]

[2] Ibid.

Today, a more common term for a lumberjack is "logger". Logging is the cutting, skidding, on-site processing, and loading of trees or logs onto trucks or skeleton cars. Modern technology changed the job of the modern logger considerably. Although the basic task of harvesting trees is still the same, the machinery and tasks are no longer the same. Many of the old job specialties on logging crews are now obsolete.

Chainsaws, harvesters, and feller bunchers are now used to cut or fell trees. The tree is turned into logs by removing the limbs (delimbing) and cutting it into logs of optimal length (bucking). The felled tree or logs are moved from the stump to the landing. Ground vehicles such as a skidder or forwarder can pull, carry, or shovel the logs. Cable systems "cars" can pull logs to the landing. Logs can also be flown to the landing by helicopter. Logs are commonly transported to the sawmill using trucks. Harvesting methods may include clear cutting or selective cutting. Concerns over the environmental impact have led to controversy about modern logging practices. In certain areas of forest loggers re-plant their crop for future generations.

A recent Wall Street Journal survey on the best jobs in the United States ended by listing being a logger as the "worst" citing "work instability, poor income and pure danger". A Bureau of Labor Statistics survey of America's most dangerous jobs put loggers at the top of the list for 2004.

In forestry, the term logging is sometimes used narrowly to describe the logistics of moving wood from the stump to somewhere outside the forest, usually a sawmill or a lumber yard. In common usage, however, the term may cover a range of forestry or silviculture activities.

Clearcut logging is not necessarily considered a type of logging but a harvesting or silviculture method, and is simply called clearcutting or block cutting. In the forest products industry logging companies may be referred to as logging contractors, with the smaller, non-union crews referred to as "gyppo loggers."

Cutting trees with the highest value and leaving those with lower value, often diseased or malformed trees, is referred to as high grading. It is sometimes called selective logging, and confused with selection cutting, the practice of managing stands by harvesting a proportion of trees.

Logging and log processing can be carried out by different methods, of which the following three are considered industrial methods:

Tree-Length Logging/Stem Only Harvesting (SOH)

Trees are felled and then delimbed and topped at the stump. The log is then transported to the landing, where it is bucked and loaded on a truck. This leaves the slash (and the nutrients it contains) in the cut area, where it must be further treated if wild land fires are of concern.

Whole-Tree Logging (WTL)

Trees and plants are felled and transported to the roadside with top and limbs intact. There have been advancements to the process which now allows a logger or harvester to cut the tree down, top, and delimb a tree in the same process. This ability is due to the advancement in the style felling head that can be used. The trees are then delimbed, topped, and bucked at the landing. This method requires that slash be treated at the landing. In areas with access to cogeneration facilities, the slash can be chipped and used for the production of electricity or heat. Full-tree harvesting also refers to utilization of the entire tree including branches and tops. This technique removes both nutrients and soil cover from the site and so can be harmful to the long term health of the area if no further action is taken, however, depending on the species, many of the limbs are often broken off in handling so the end result may not be as different from tree-length logging as it might seem.

Cut-to-Length Logging

Cut-to-length logging is the process of felling, delimbing, bucking, and sorting (pulpwood, sawlog, etc.) at the stump area, leaving limbs and tops in the forest. Harvesters fell the tree, delimb, and buck it, and place the resulting logs in bunks to be brought to the landing by a skidder or forwarder. This method is routinely available for trees up to 900 mm (35 in) in diameter. Harvesters are employed effectively in level to moderately steep terrain. Harvesters are highly computerized to optimize cutting length, control harvesting area by GPS, and use price lists for each specific log to archive most economical results during harvesting.

In cut-to-length logging, one of the first jobs that a new logger is entrusted with is bucking logs into their proper lengths. While one may conclude that cutting logs to particular lengths is an straight forward job, there are actually many complications associated with the process. If all logs were the same, healthy and uniform, it would simplify the job. However, in the real-world, each tree is different and can pose issues for even for a seasoned logger. As such, a bucker needs to pay close attention to the different characteristics of a tree, they need to have a knowledge of grade in a log as well as how to cut a log to maximize the amount of board footage that can be gleaned from that tree.[3]

https://en.wikipedia.org/wiki/Logging

Many techniques are used to determine the length of a log cut and loggers tend to have their own techniques. There are a couple of measuring tools and techniques that are more common than others. Some loggers will use a stick of a specific length, and then starting from the butt of the tree, the bucker will lay the stick against the tree trunk, then flip the stick end over end to measure the next length. This process is continued until the desired length is reached and then the tree is cut at that point. Thus, is a four foot stick is used, the bucker can easily measure out lengths in increments of four feet. In addition, a mark can be placed in the middle of the stick to provide two foot measurements.

Other techniques utilize logger's tape measure. Another technique is to drive stakes in the ground at the desired length.

It should be appreciated that in addition to finding great trees, the profitability of a logging business is also based on the efficiency with which the logger is able to process the trees into logs for being shipped to the sawmill. The above-described techniques for measuring for bucking can be inefficient and limiting. This is especially realized by the fact that some trees have diseased areas, crotches, etc. that may limit the length of the log that can be bucked from the tree. Thus, there is a need in the art for a system and method to buck trees that increases the efficiency of the process, achieves the longest cuts as possible and also provides the flexibility for making shorter cuts as dictated by the nuances of the tree.

BRIEF SUMMARY

The various embodiments of the present invention provide for a multi-length bucking attachment that can be attached to a typical logging rig including a knuckle boom tractor and topping saw mounted to a logging trailer. The multi-length bucking attachment is secured to the trailer proximate to the knuckle boom tractor and includes extension arms that extend from the trailer and terminate with a cross-member. One or more hatch arms are attached to the cross-member. Next, the multi-length bucking attachment is calibrated such that the distance between the saw blade of the topping saw and the hatch arms of the multi-length bucking attachment are set to precise lengths that correspond with desired log cut lengths. Advantageously, a logger can use the multi-length bucking attachment to buck trees more efficiently because the logger can make cuts of different lengths as necessary to avoid faults in the trees yet, obtain the longest cut possible given the tree faults. Further, the logger can work independently from a bucker because the logger can clearly identify the cut lengths by measuring them against the attachment. These and other advantages of the present invention are described in more detail in conjunction with the attached drawings.

One embodiment of the invention includes an apparatus that is used in conjunction with logging equipment for measuring cut lengths of trees (referred to as bucking). Typically, the logging equipment includes a loader and a saw that are positioned relative to each other at a fixed distance.

In this embodiment, the apparatus comprises a base and a measurement ruler. The base includes a proximal end and a distal end. The proximal end is coupled to the loader, usually by means of a base plate or other connection mechanism. The base then extends away from the loader. In some embodiments, the base includes one or more extension arms that can be adjusted between a retracted state and a fully extended state. In the retracted state, the logging equipment can be more readily and safely moved and in the operational state, the device can be used for bucking. In some embodiments, the base includes exactly two extension arms, wherein each extension arm includes a plurality of telescoping sections and each extension arm includes a base plate this is attached to the proximal end of the extension arm and that interfaces with the logging equipment.

The measurement ruler is adjustably attached to a distal end of the base and includes at least a first hatch. The measurement ruler can be adjusted such that hatch is a particular distance from a saw blade of the saw. Advantageously, in this configuration the loader can move a tree through the saw until the end of the tree aligns with the hatch and then actuate the saw blade of the saw to cut the tree at the particular length corresponding with the hatch.

In some embodiments, the measurement ruler comprises a cross-member that includes a left end and a right end. The cross-member is attached to the distal ends of the extension arms. For instance, in a two-extension arm embodiment, the left end is associated with one of the extension arms and the right end is associated with the other extension arm. Further, a plurality of hatches are connected to the cross-member and extend substantially perpendicular to the cross-member and away from the base.

In some embodiments, the one or more of the hatches are slideably mounted to the cross-member such that they can be adjusted across the cross-member for selecting particular cut lengths.

Further, in some embodiments, the hatches are constructed of a metal tube that is connected to the cross-member, and a plastic extension is inserted into a distal opening of the metal tube from the cross-member.

When the extension arms are adjustable, the extension arms can be adjusted to change the angle of the cross-member relative to the logging equipment.

In addition, in some embodiments, the extension arms include a hinged connector at the distal end and the cross-member is connected to the extension arm by being connected to the hinged connector. This configuration allows the measuring ruler to be moved between an operational state and a transport state by moving the hinged connector from one position to another position.

It should also be appreciated that in some embodiments, the cross-member is slideably mounted to the extension arms such that the cross-member can be adjusted to change the angle of the cross-member relative to the logging equipment.

As such, in various of the embodiments, the extension arms and/or the cross-member can be adjusted such that the hatches are substantially perpendicular to a tree that is pulled through a saw by the loader and aligned with one of the plurality of hatches.

Another embodiment of the present invention includes a method of bucking trees. The method includes the action of fixedly orienting a loader and a topping saw relative to each other. This can be done by connecting the equipment to opposing ends of a logging platform or logging trailer thereby fixing their relative positions. A bucking apparatus can be proximate to the loader. In some embodiments, the bucking apparatus includes a base that includes a proximal end and a distal end, and wherein the proximal end is configured to be coupled in proximity to the loader and extend away from the loader. In addition, the bucking apparatus includes a measurement ruler that is adjustably attached to a distal end of the base. The measurement ruler includes at least a first hatch and the measurement ruler can be adjusted such that the at least first hatch is a particular distance from a saw blade of the topping saw. As such, the loader can move a tree through the topping saw until the end of the tree aligns with the at least first hatch and then actuate the saw blade of the topping saw to cut the tree at the particular length.

In some embodiments, the measurement ruler includes a plurality of adjustable hatches. In such embodiments, the method further includes measuring from the saw blade a first distance towards the measuring apparatus and aligning a first hatch with the first distance. Also, measuring from the first hatch a second distance and aligning the second hatch with the second distance. In addition, measuring from the first hatch an nth distance and aligning the nth hatch with the nth distance.

The method also may include the action of adjusting the measurement ruler relative to the base such that when the loader pulls a tree through the topping saw towards the measuring ruler, the hatches are substantially perpendicular to the tree.

DETAILED DESCRIPTION OF EMBODIMENTS

The present invention, as well as features and aspects thereof, is directed towards providing an apparatus and a method for bucking trees, and more particularly, an apparatus to be used in conjunction with a knuckle boom or similar machine to identify the cutting points on a tree to create a log of specific length.

Bucking is the process of determining where to cut a tree in order to produce the longest log possible or, to obtain a log of a specific length. A single tree may produce one or more logs and some amount of branches and tops. The logs are generally sent to a sawmill to be converted into various types of lumbers. As such, depending on which sawmill the logs are destined to go and the purpose for the logs, there may be certain length requirements for the logs.

As an exemplary example, many sawmills are set up to receive and process logs in one or more of the following lengths:

33 feet
37 feet
41.5 feet
45.5 feet
49 feet, as non-limiting examples.

When bucking a tree, there may be crotches, diseased areas, and other faults that must be cut out of a log. Thus, the length of a log may be governed by the location of the faults in the tree. Because nature tends to be random, one skilled in the art can appreciate that the bucking process may prevent a logger from making all of the logs the same length.

Figure 1:
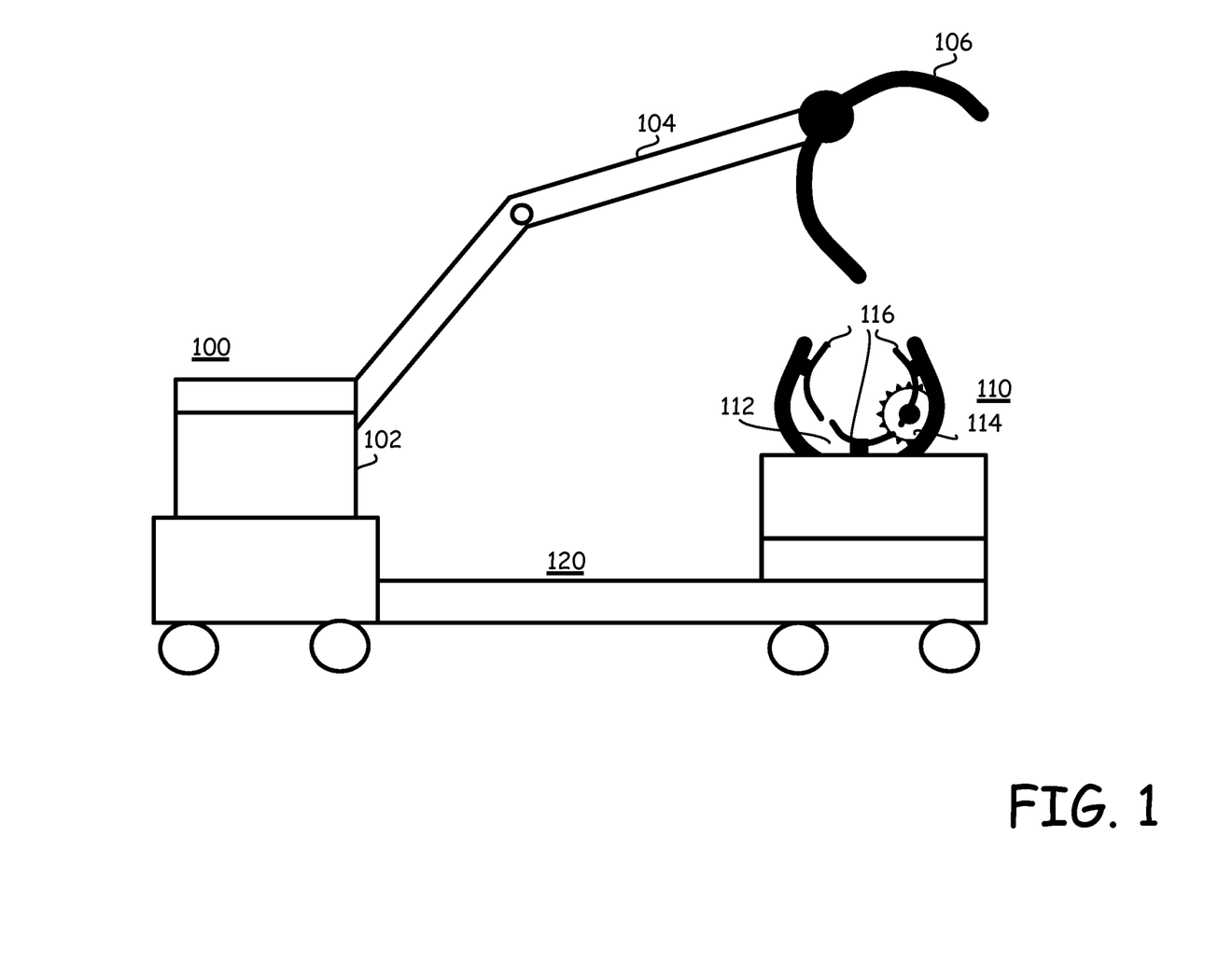
FIG. 1 is diagram of an exemplary operating environment for a logger.

FIG. 1 is diagram of an exemplary operating environment for a logger. In the illustrated environment, a knuckle boom tractor 100 is being operated in conjunction with a topping saw 110. The knuckle boom, such as a CAT 599D, includes a cabin 102 and a boom 104. The distal end of the boom 104 includes a claw 106 that is used to pick up and move the trees/logs. The topping saw 110 is used to de-limb a tree and then cut the tree into log of a certain length. A typical topping saw includes a cradle 112 for receiving trees, de-limbing blades 116 and a saw blade 114.

In operation, a logger will utilize the boom 104 to grasp a tree near the end or butt of the tree with the claw 106, and place the butt tree into the cradle 112 with the butt end extending out one side of the cradle 112 and the rest of the tree extending out of the other end. The logger can then close the cradle 112 to cause the de-limbing blades 116 to close around the trunk of the tree with the application of pressure. The logger can then use the boom 106 to pull the tree through the de-limber to strip the tree of branches. The knuckle boom 100 can pivot around to pick up and place trees and logs. The topping saw is pivotally mounted to the trailer 120 so that as the tree is pulled through the cradle 112, the topping saw can rotate. This is due to the fact that as the logger pivots the knuckle boom 100 around to pull the tree through the topping saw 110, the tree is moved towards a parallel position relative to the trailer, whereas when the tree is inserted into the cradle 112, the tree is closer to a 45 to 90 degree position relative to the trailer 120. The logger can then move the de-limbed tree back and forth within the cradle 112 until it is set to the desired length. The top of the tree then falls into a pile along with all the branches, and the logger can open the cradle 112 and move the log to a pile or a loader to be hauled to a sawmill.

As illustrated, the knuckle boom equipment 100 and the topping saw 110 are typically mounted to a trailer such that the relative orientation and distance between the knuckle boom 100 and the topping saw does not shift. If the trailer 120 is moved, the knuckle boom 100 and the topping saw 110 remain in constant position relative to each other.

Figure 2:
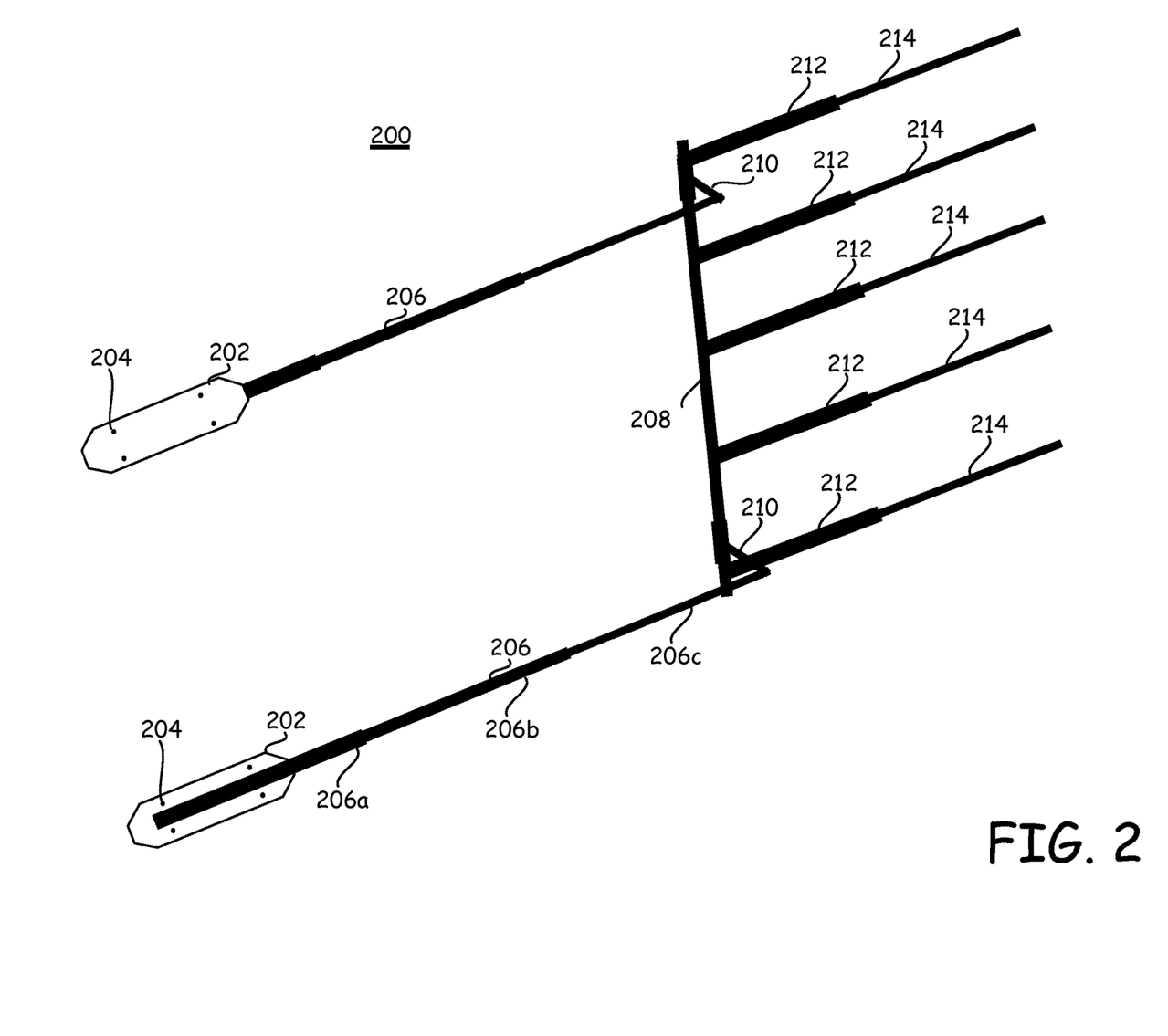
FIG. 2 is a conceptual diagram of a multi-length bucking attachment that can be used in conjunction with a knuckle boom or other similar equipment.

FIG. 2 is a conceptual diagram of a multi-length bucking attachment that can be used in conjunction with a knuckle boom or other similar equipment. In general, the multi-length bucking attachment 200 ("attachment") can be attached to the knuckle boom or other equipment and used to measure cuts to be made by a slasher and/or a topping saw. More specifically, the attachment includes base and a measurement rule. In the illustrated embodiment, the base includes two attachment plates 202 that are used to connect the attachment 200 to the logging equipment, such as a knuckle boom 100, the trailer 120 or to the sub-frame of the loader. The plates can be welded to the frame of the logging equipment, secured in a connector or bolted to the equipment as illustrated in the embodiment of FIG. 2 by the four bolt apertures 204 in the plates 202. In an exemplary embodiment, the attachment is used with a CAT 559D. The CAT 559D includes factory bolts that are used to hold pins, outriggers and a finder. These bolts can be removed to accommodate the attachment 200. However, it will be appreciated that the particular means for connecting the attachment to the equipment and the type and model of the equipment are simply provided as a non-limiting example and the present invention is not limited to this particularly described embodiment. Advantageously, by attaching the multi-length bucking attachment to the loader or logging equipment, more stability is able to be attained. It is anticipated that some embodiments may be configured to be installed on the ground separate from the logging equipment (i.e. the platform or loader frame etc.) but that such embodiments are more susceptible to being misaligned as the equipment shifts during operation. But in the embodiments in which the multi-length bucking attachment hangs from the loading equipment (like a balcony or deck from a building) the attachment does not rest on the ground but rather is suspended above the ground. Advantageously, this embodiment can be used where the ground or terrain is not level without having an effect on the operation. It will also be appreciated that in some embodiments, the multi-length bucking attachment may actually rest on the ground but still be rigidly attached to the logging equipment to maintain calibration. In other embodiments, the attachment may simply include one or more telescoping legs to allow the attachment to be supported by the ground, wherein the telescoping legs allow the support to be provided even if the ground is not level.

Each of the plates 202 include an extension arm 206. A proximate end of the extension arm 206 is connected to the plate 202. The extension arms 206 can be welded to the plate 202 or attached by other means such as brackets, bolts, sliding into a sleeve that is integral or attached to the plate 202 or other similar techniques as non-limiting examples.

In the illustrated embodiment, the extension arms 206 are shown as being telescoped arms with three components: base 206a, midsection 206b and end 206c. Advantageously, this embodiment allows the attachment to be retracted when not being used and for transport, but then extended outward for operation. This aspect also allows the attachment to be adjusted during use to ensure that it is in proper alignment. However, in some embodiments the extension arms may be rigid, include more telescoping components, may be hinged to each other to allow them to fold up, can be attached to the plates 202 by means of a hinge to allow the extension arms to be folded upward, etc. as a few non-limiting examples.

The measuring ruler includes a cross-member 208 and a plurality of extension arms 206. The cross-member 208 is attached to the distal ends of the extension arms 206 of the base. The extension arms 206 are substantially parallel to each other in the illustrated embodiment, and the cross-member 208 can be orthogonally related to the extension arms 206 or can be adjusted to be at an angle. However, it should be appreciated that in other embodiments, the extension arms 206 may be angled inwardly or outwardly and the cross-member can be attached at an angle. The cross-member 208 provides stability and moves with the equipment in order to insure proper alignment and accurate measurements consistently during cutting. It should also be appreciated that in some embodiments, rather than two extension arms, a single extension arm can attach to the equipment and the cross-member attached to the end of the extension arm like a "T". In other embodiments, more than two extension arms can be utilized to improve stability.

In various embodiments, the cross-member 208 can be fixedly attached to the extension arms 206, such as by welding, can be secured with bolts or brackets, and/or can be secured with an adjustable mechanism to allow the cross-member to be slid to different positions.

Figure 3:
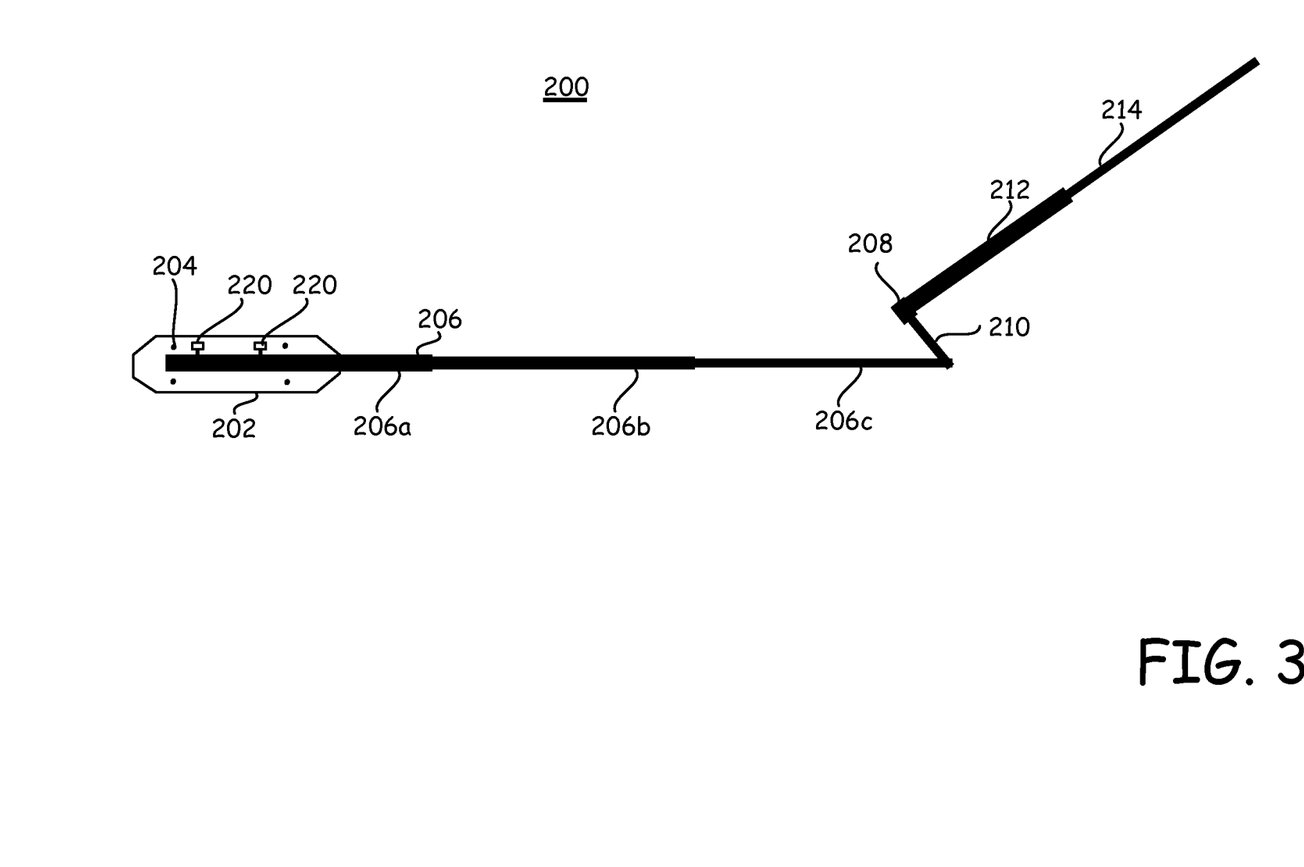
FIG. 3 is a side view of the multi-length bucking attachment 200 illustrated in FIG. 2.

In the illustrated embodiment, the cross-member 208 is attached to the extension arms 206 using swivel arms 210 (as best seen in FIG. 3). The swivel arms 210 in this embodiment advantageously allow the cross-member 208 to be folded out for operational use or folded in when not in use or for transport.

The cross-member 208 includes a plurality of hatch arms 212. The hatch arms 212 can be permanently attached to the cross-member 208 but preferably are attached with a mechanism that allows the hatch arms 212 to easily slide into different positions or removed all together. Those skilled in the art will appreciate that the lines on a ruler are referred to as hatch lines. In the multi-length bucking attachment, the arms extending from the cross-member 208 are referred to as hatch arms because they are used to set up the measurements for cutting the logs.

In the illustrated embodiment, the hatch arms 210 are metal tubes that extend orthogonally rom the cross-member 208. In operation, plastic or PVC pipes or tubes 214 can be slid into the tubes to extend the hatch arms 212 further into the measuring area. The PVC pipes 214 can be secured within the hatch arms 212 by a clamp or bolt to prevent them from falling out during operation. It should be appreciated that the hatch arms 212 can simply be longer and not require the PVC tubes 214 in some embodiments. Further, in other embodiments, the cross-member 208 may include a plurality of holes that are used to receive PVC pipes and thus the entire hatch arm 212 would be a PVC pipe. The advantage of incorporating PVC tubes into the hatch arms 212 is that they are flexible and will not bend when the hatch arms are inadvertently hit by a log or tree.

FIG. 3 is a side view of the multi-length bucking attachment 200 illustrated in FIG. 2. As can be seen in FIG. 3, the attachment arm 200 is fully extended and ready for operation. The swivel arms 210 are lifted into a position to allow the cross-member 208 and hatch arms 212 to move outwards toward the measuring area.

Figure 4:
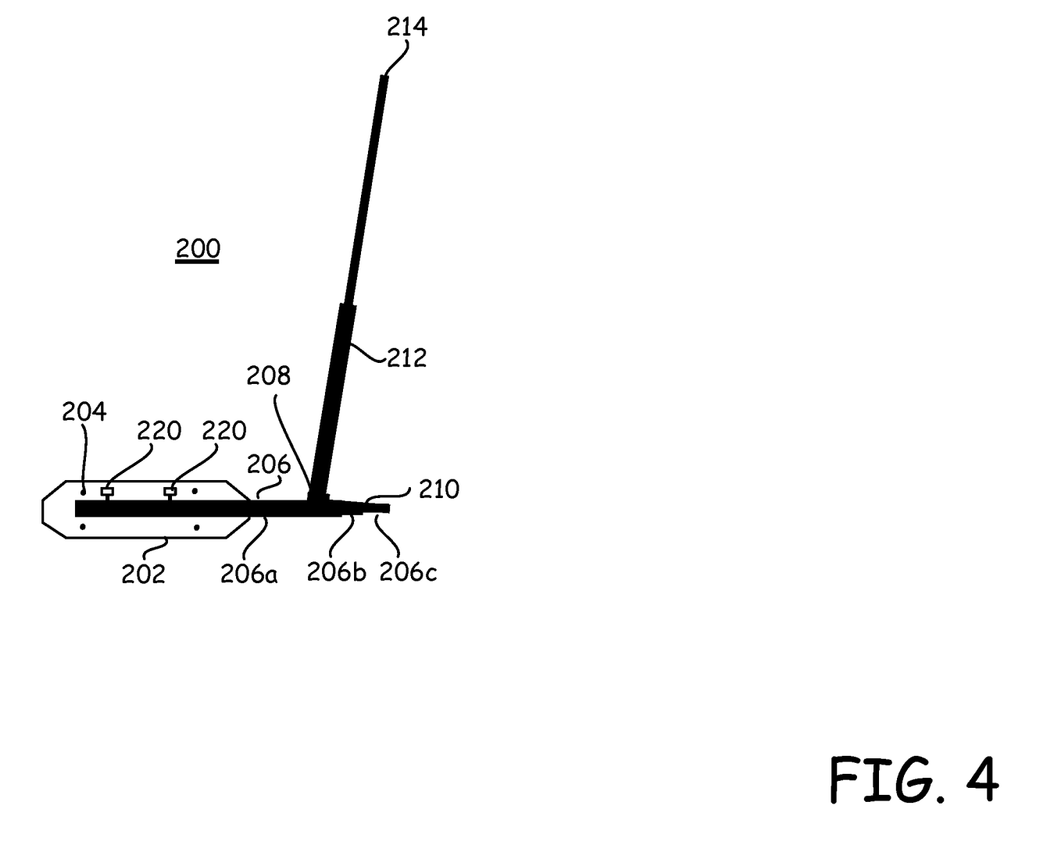
FIG. 4 is a side view of the multi-length bucking attachment 200 illustrated in FIG. 2 in a retracted state.

FIG. 4 is a side view of the multi-length bucking attachment 200 illustrated in FIG. 2 in a retracted state. Here, the extension arm 206 has been retracted by sliding the middle section 206b into the base section 206a, and the end section 206c is slid into the middle section 206b. Bolts 220 can be tightened down to secure the extension arm 206 into the retracted state. Further, swivel arm 210 has shown as being swiveled downward thereby raising the hatch arms 212 into a more vertical orientation. It should be appreciated that in this configuration, the equipment, such as a knuckle boom, than then be moved to a different location without damaging the attachment 200 or the components thereof.

Figure 5:
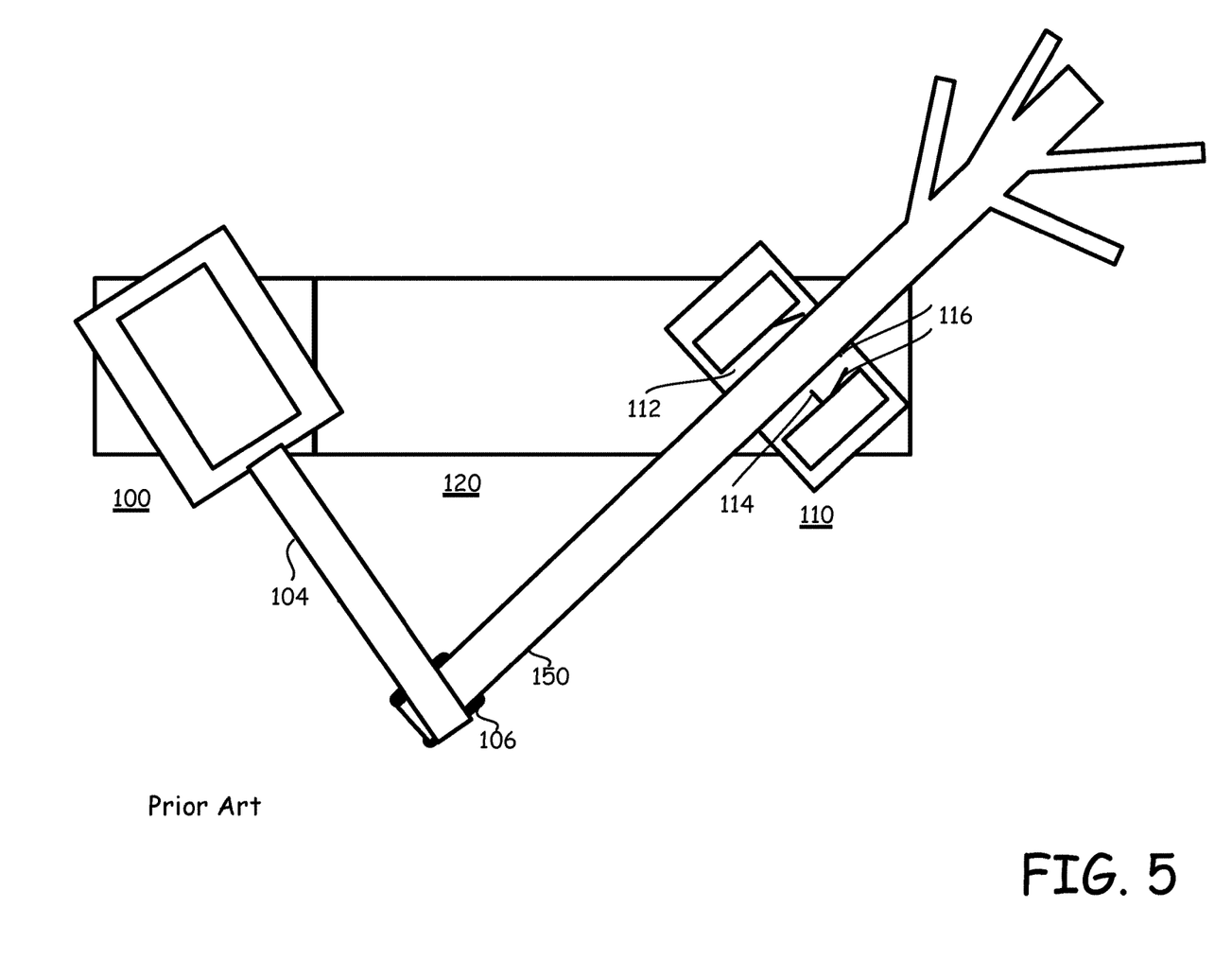
FIG. 5 is a top plan view of a knuckle boom 100 and topping saw 110 mounted to a logging trailer 120.

FIG. 5 is a top plan view of a knuckle boom 100 and topping saw 110 mounted to a logging trailer 120. The boom arm 106 and claw 106 are shown as holding a tree 150 near the end. As the knuckle boom 100 pivots clock-wise, the tree is pulled through the cradle 112 and the de-limbing blades 116 remove the limbs from the tree.

Figure 6:
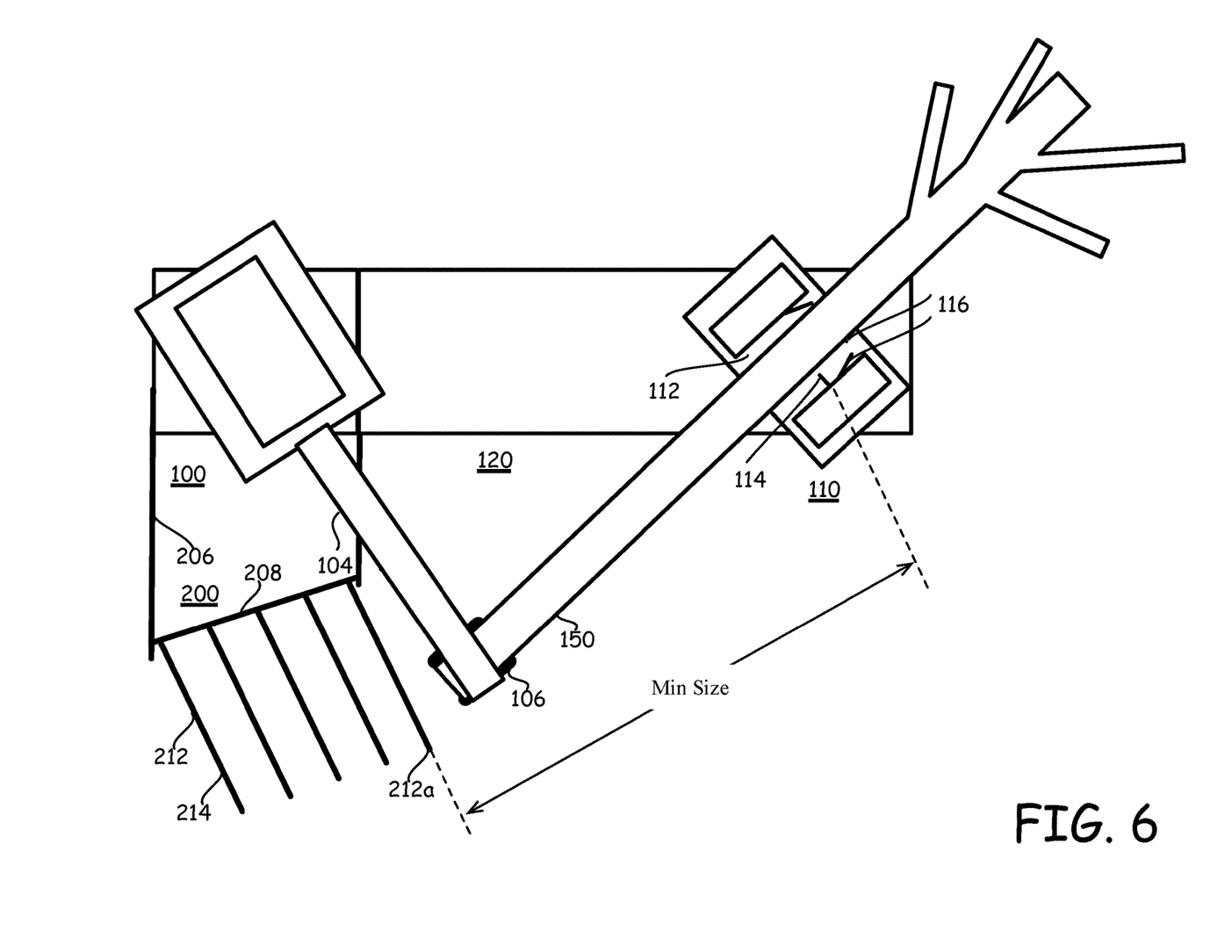
FIG. 6 is a top plan view of the knuckle boom 100 and topping saw 110 mounted to a logging trailer 120 with the multi-length bucking attachment 200 attached.

FIG. 6 is a top plan view of the knuckle boom 100 and topping saw 110 mounted to a logging trailer 120 with the multi-length bucking attachment 200 attached. The extension arms 206 are attached to the logging trailer 120 proximate to the knuckle boom 100. The cross-member 208 is attached to the extension arms 206 at an angle to provide accurate measurements as the tree, when pulled over the hatch arms 212 may not be parallel to the logging trailer 120. The hatch arms 212 can then be slid along the cross-member 208 to the precise locations to correspond with the desired cut lengths.

More specifically, because the knuckle boom 100 and the topping saw 110 are mounted to the logging trailer 120, they remain fixed relative to each other. As such, the logger can measure from the saw blade 114 and set the hatch arm 212a to the precise length of the minimum cut size. The remaining hatch arms 212 can then be set relative to the first hatch arm 212a (typically 4 feet apart but any required distance can be set since the hatch arms 212 are full adjustable along the cross-member 208).

Figure 7:
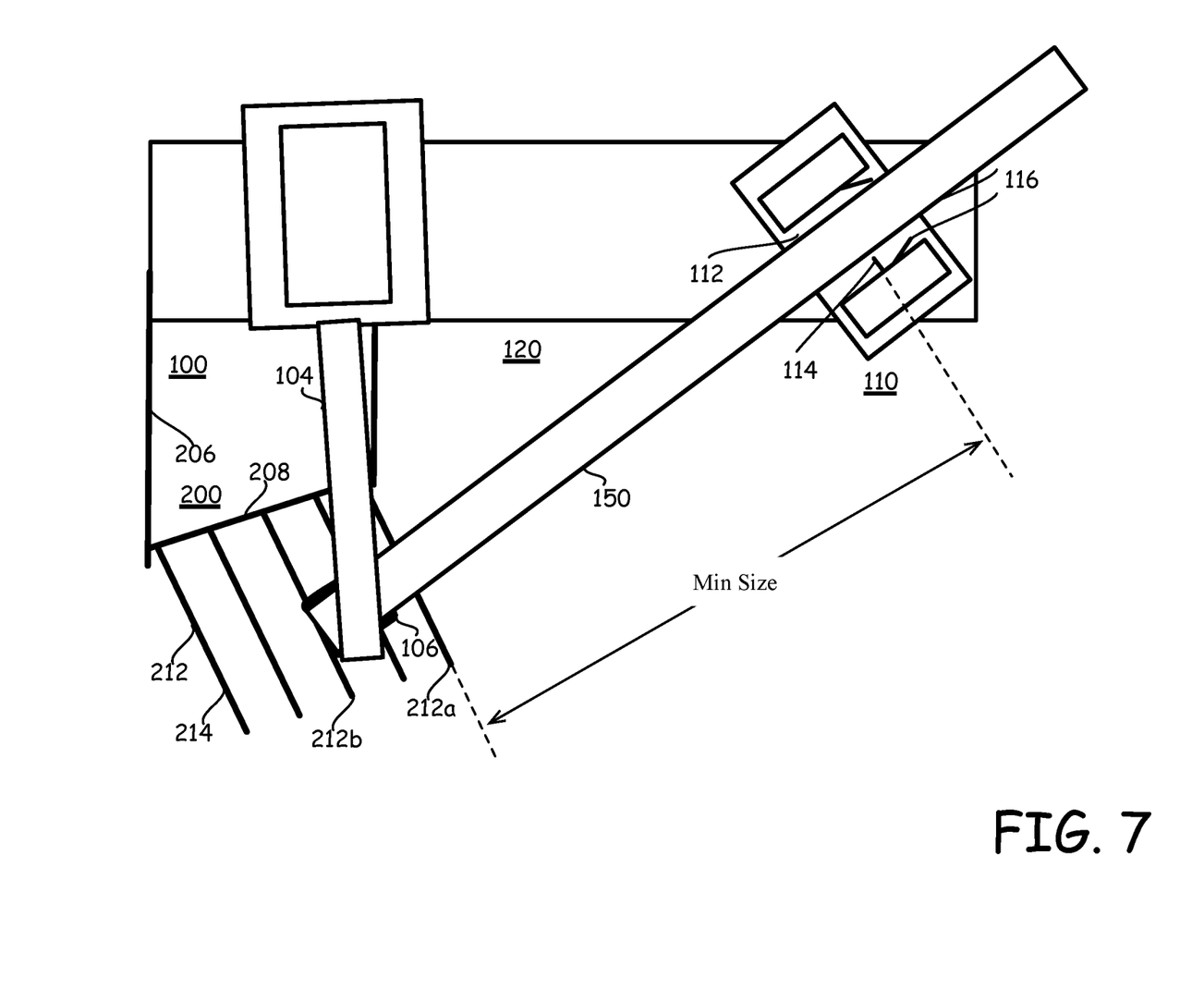
FIG. 7 illustrates the use of the multi-length bucking attachment when it the state of being ready to make a cut.

FIG. 7 illustrates the use of the multi-length bucking attachment when it the state of being ready to make a cut. In the illustrated embodiment, the tree has been pulled through the de-limber and the boom 106 has been used to position the tree to align the end of the tree with hatch arm 212b. The logger can now actuate the saw blade 114 to cut a log the precise length from the saw blade 114 to the hatch arm 212b.

Thus, it should be understood that the multi-length bucking attachment can be attached to a logging configuration of FIG. 1 and calibrated for as many cut lengths as desired by simply adding hatch arms 212 at the desired distance. In the logging operation, the logger can examine the tree to identify faults, and then make a cut to any of the hatch arm lengths such that the fault can be eliminated from the cut log. The logger can thus then create logs of varying lengths without having to use a stick or measuring tape for each cut.

Further, the logger can stack the logs based on their size as the different length logs may be destined for different saw mills.

In some embodiments, the cross-member 208 may be preconfigured with hatch marks to help facilitate locating the various hatch arms at desired measurement distances. It should also be appreciated that the multi-length bucking attachment 200 can be mounted to either the left side or right side of the logging trailer. It should be further appreciated that the cross-member 208 may extend beyond the extension arms such that longer or shorter cuts can be attained.

In the description and claims of the present application, each of the verbs, "comprise", "include" and "have", and conjugates thereof, are used to indicate that the object or objects of the verb are not necessarily a complete listing of members, components, elements, or parts of the subject or subjects of the verb.

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art.

It will be appreciated by persons skilled in the art that the present invention is not limited by what has been particularly shown and described herein above. Rather the scope of the invention is defined by the claims that follow.

What is claimed is:

1. An apparatus that can be used within a logging equipment environment that includes a loader and a saw that are mounted on a trailer, the apparatus configured to be used for measuring cut lengths of trees and comprising:
    a base comprising a first attachment plate and a second attachment plate and a first extension arm having a proximal end attached to the first attachment plate and a second extension arm having a proximal end attached to the second base plate whereby the first and second attachment plates of the base are configured to be coupled to the loader or the trailer and the first and second extension arms extend horizontally away from the first and second attachment plates;
    the first and second extension arms being adjustable between an extended state and a retracted state;
    a first swivel arm pivotally attached to the distal end of the first extension arm and a second swivel arm pivotally attached to the distal end of the second extension arm;
    a cross-member that includes a first end and a second end and wherein the first end is attached to the first swivel arm and the second end is attached to the second swivel arm; and
    a plurality of hatch arms, wherein a first hatch arm of the plurality of hatch arms can be adjusted to a first position relative to the first end of the cross-member by sliding the first hatch arm along the cross-member between the first end and the second end of the cross-member and at least a second hatch can adjusted to a second position relative to the first hatch arm by sliding the second hatch arm along the cross-member between the first hatch arm and the second end of the cross-member, whereby, when the apparatus is attached to the loader or trailer, the loader can move a tree through the saw until the end of the tree aligns with the at least first hatch arm or the second hatch arm and then actuate the saw blade of the saw to cut the tree at either a first length or a second length.

2. The apparatus of claim 1, wherein the first and second extension arms includes a plurality of telescoping sections.

3. The apparatus of claim 2, wherein the plurality of hatch arms are connected to the cross-member such that they extend substantially perpendicular to the cross-member and away from the first and second base plates.

4. The apparatus of claim 3, wherein each of the plurality of hatch arms include a metal tube that is connected to the cross-member, and a plastic extension that is inserted into a distal opening of the metal tube.

5. The apparatus of claim 4, wherein a length of one or more of the extension arms can be adjusted to change the angle of the cross-member relative to the first and second extension arms.

6. The apparatus of claim 5, wherein the first and second swivel arms are attached by a hinged connector to the distal end of the first and second extension arms and the cross-member is connected to an end of the swivel arms distal from the hinged connector, wherein the first and second swivel arms can be moved between an unfolded state extending away from the respective extension arm and a folded state substantially parallel and overlapping with the respective extension arm, wherein the apparatus can be placed into an operational state by moving the first and second extension arms into an extended state and moving the first and second swivel arms into an unfolded state and the apparatus can be placed into a transport state by moving the first and second extension arms into a retracted state and moving the first and second swivel arms into a folded state.

7. An apparatus that can be used in a logging equipment environment that includes a loader and a saw that are fixedly attached to a logging platform, the apparatus comprising:
    a base that comprises:
    a plurality of attachment plates; and
    a plurality of extension arms, each of the extension arms including a proximal end and a distal end, and wherein the proximal end is configured to be coupled to one of the plurality of attachment plates and extend away from the attachment plate and, each of the plurality of extension arms is configured to be adjusted between a retracted state and an extended state;
    a measurement ruler, the measurement ruler comprising:
    a cross-member that has a length and that is attached to each of the plurality of extension arms along the length of the cross-member; and
    a plurality of hatch arms that are slideably attached to the cross-member and extending perpendicularly from the cross-member and away from the base such that the hatch arms can be slid along the length of the cross-member, and wherein a first hatch arm can be secured at a first position relative to one end of the cross-member, a second hatch arm configured to be secured at a second position relative to the first hatch arm and an nth hatch arm configured to be secured at an nth position relative to the nth-1 hatch arm, wherein the first position, second position and nth position can be adjusted to any position along the cross-member.

8. The apparatus of claim 7, wherein the extension arms include a hinged connector at the distal end and the cross-member is connected to the extension arm by being connected to the hinged connector, wherein the measuring ruler can be moved between a folded state and an unfolded state and wherein the apparatus can be moved between an operational state in which the first and second extension arms are extended and the cross member is unfolded, and a transport state in which the first and second extension arms are retraced and the cross member is folded.

9. The apparatus of claim 7, wherein the extension arms include a hinged connector at the distal end and the cross-member is connected to a plurality of swivel arms on a first end of the swivel arms, and a second end of the swivel arms is connected to the hinged connector at the distal end of the extension arms, wherein the measuring ruler can be moved between a folded state and an unfolded state, and wherein the apparatus can be moved between an operational state in which the extension arms are extended and the swivel arms are unfolded, and a transport state in which the extension arms are retraced and the swivel arms are folded.

* * * * *